(12) United States Patent
Apak

(10) Patent No.: US 11,549,267 B2
(45) Date of Patent: Jan. 10, 2023

(54) SNOW HOOK FOR SOLAR PANELS

(71) Applicant: Yavuz Apak, Bellinzona (CH)

(72) Inventor: Yavuz Apak, Bellinzona (CH)

( * ) Notice: Subject to any disclaimer, the term of this patent is extended or adjusted under 35 U.S.C. 154(b) by 0 days.

(21) Appl. No.: 17/476,185

(22) Filed: Sep. 15, 2021

(65) Prior Publication Data

US 2022/0120087 A1 Apr. 21, 2022

(30) Foreign Application Priority Data

Oct. 19, 2020 (CH) .................... 01342/20

(51) Int. Cl.
*E04D 13/10* (2006.01)
*H02S 20/23* (2014.01)

(52) U.S. Cl.
CPC .............. *E04D 13/10* (2013.01); *H02S 20/23* (2014.12)

(58) Field of Classification Search
CPC ..................................... E04D 13/10
USPC ....................................... 52/24, 26
See application file for complete search history.

(56) References Cited

U.S. PATENT DOCUMENTS

| 185,137 | A | * | 12/1876 | Rogers | A47G 7/041 |
| | | | | | 52/24 |
| 1,222,953 | A | * | 4/1917 | Histand | E04D 13/10 |
| | | | | | 52/24 |
| 1,530,233 | A | * | 3/1925 | Campbell | E04D 13/10 |
| | | | | | 52/24 |
| 3,289,361 | A | * | 12/1966 | Holliday | E04D 13/10 |
| | | | | | 29/897.3 |
| 5,070,660 | A | * | 12/1991 | Willa | E04D 13/10 |
| | | | | | 52/24 |
| 5,655,334 | A | * | 8/1997 | Kwiatkowski | E04D 13/10 |
| | | | | | 52/24 |
| 5,669,184 | A | * | 9/1997 | Anderson | E04D 13/10 |
| | | | | | 52/24 |
| 6,070,368 | A | * | 6/2000 | Anderson | E04D 13/10 |
| | | | | | 52/24 |
| 7,874,105 | B2 | * | 1/2011 | Jacobs | E04D 1/20 |
| | | | | | 52/26 |
| 9,103,125 | B2 | * | 8/2015 | Graga | E04D 13/10 |
| 9,243,410 | B1 | * | 1/2016 | Garber | E04D 13/10 |
| 10,450,757 | B2 | * | 10/2019 | McIntosh | E04D 3/3606 |

(Continued)

FOREIGN PATENT DOCUMENTS

| EP | 2672036 | | 12/2013 |
| JP | 2001234619 | A * | 8/2001 |

(Continued)

*Primary Examiner* — Beth A Stephan
(74) *Attorney, Agent, or Firm* — Duane Morris LLP; Gregory M. Lefkowitz; Joaquin Hernandez

(57) ABSTRACT

A snow hook (1) is described, the snow shook comprising a plate (2) having at least two folding lines (3) delimiting an inclined portion (4) between two parallel portions (5, 6) of the plate (2), the two parallel portions (5, 6) having a predefined distance between them in the rest condition. A predetermined amplitude (α) of at least one angle between a parallel portion (5) and the inclined portion (4) in the rest condition can be reduced by moving the parallel portions (5, 6) closer together, in order to insert the snow hook (1) between two solar panels (100), the parallel portions (5, 6) returning into their spaced rest condition when released, so as to cause the pressing contact of each parallel portion (5, 6) against a surface (110a) of a respective solar panel of the two solar panels (100).

10 Claims, 3 Drawing Sheets

(56) References Cited

U.S. PATENT DOCUMENTS

| | | | | |
|---|---|---|---|---|
| 2007/0245636 A1* | 10/2007 | Ayer | ............... | E04D 13/10 52/24 |
| 2009/0205262 A1* | 8/2009 | Andrew | ............... | E04D 13/10 52/26 |
| 2014/0326838 A1* | 11/2014 | West | ............... | F24S 25/61 248/74.2 |

FOREIGN PATENT DOCUMENTS

| JP | 2008025185 A * | 2/2008 |
|---|---|---|
| JP | 2015045128 | 3/2015 |
| JP | 2015168941 | 9/2015 |
| JP | 2015209678 | 11/2015 |

* cited by examiner

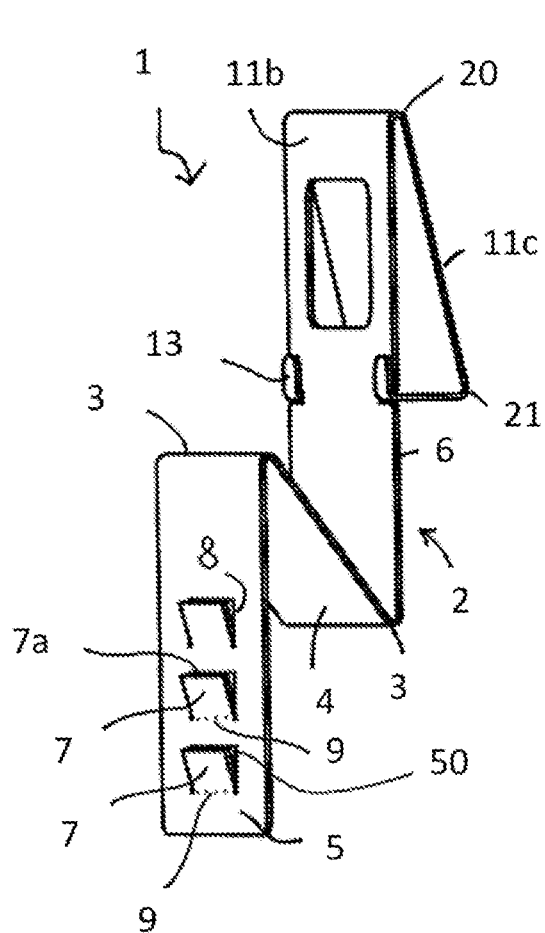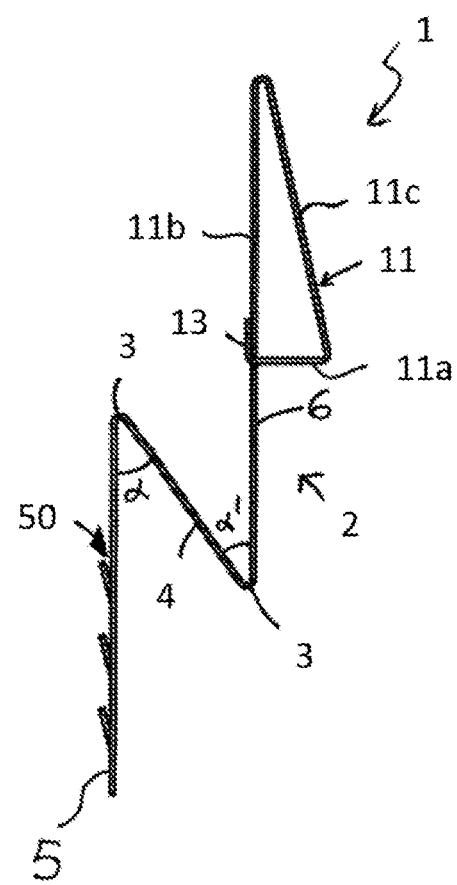
FIG. 2
FIG. 3

SNOW HOOK FOR SOLAR PANELS

FIELD OF APPLICATION

The present invention relates to a snow hook for solar panels, comprising a plate having a portion intended to perform coupling of the hook to the solar panels and a portion intended to remain exposed and projecting above the solar panel, in order to stop the snow.

The present invention also relates to a method of manufacturing the snow hook for solar panels of the aforementioned type.

PRIOR ART

Snow hooks for solar panels are already known and consist of profiled parts which can be mounted on the roofing of houses, in particular on solar panels, so as to remain projecting from the working surface of the panels, during use, thus forming a projection with respect to said surface, preventing solid blocks of snow from sliding off the roof and suddenly falling onto the ground, thus endangering persons.

The aforementioned function of snow hooks is particularly important in the case of roofs provided with solar panels (i.e. photovoltaic panels), where the roof has a much smoother and flatter surface of the tiles, thus favouring sliding of the snow thereon.

In fact, owing to the snow hook, a large-size block of snow which has accumulated on the solar panels may be retained at one or more points (by respective one or more hooks) and continue to fall towards the ground only after being divided up into several smaller-size blocks, which are therefore less dangerous, or after partially melting.

However, the known snow hooks for solar panels have a number of drawbacks which are summarised below.

Firstly, the hooks are made of plastic material and therefore may be subject to structural deformations in view of the operating temperatures of the solar panels and the variations in temperature, in particular between the winter and summer seasons, but also over the course of a single day. Moreover, the plastic hooks fitted to the solar panels do not have a particularly attractive appearance, among other things due to discolouring of the material, following exposure to the sun.

There therefore exists the need to provide a snow hook which overcomes the aforementioned technical problems, namely a hook which is not subject to alterations in its form or structure also as a result of severe climatic or load conditions, and which has an attractive appearance, even over the course of time, substantially overcoming all of the drawbacks mentioned above.

SUMMARY OF THE INVENTION

Characteristic features and advantages of the snow hook for solar panels according to the present invention are described with reference to the accompanying drawings provided solely by way of a non-limiting example of the present invention.

BRIEF DESCRIPTION OF THE ATTACHED DRAWINGS

FIG. 2 is a perspective view of the snow hook shown in FIG. 1;

FIG. 3 is a cross-sectioned side view of the snow hook according to FIG. 2;

DETAILED DESCRIPTION

Figure 1:
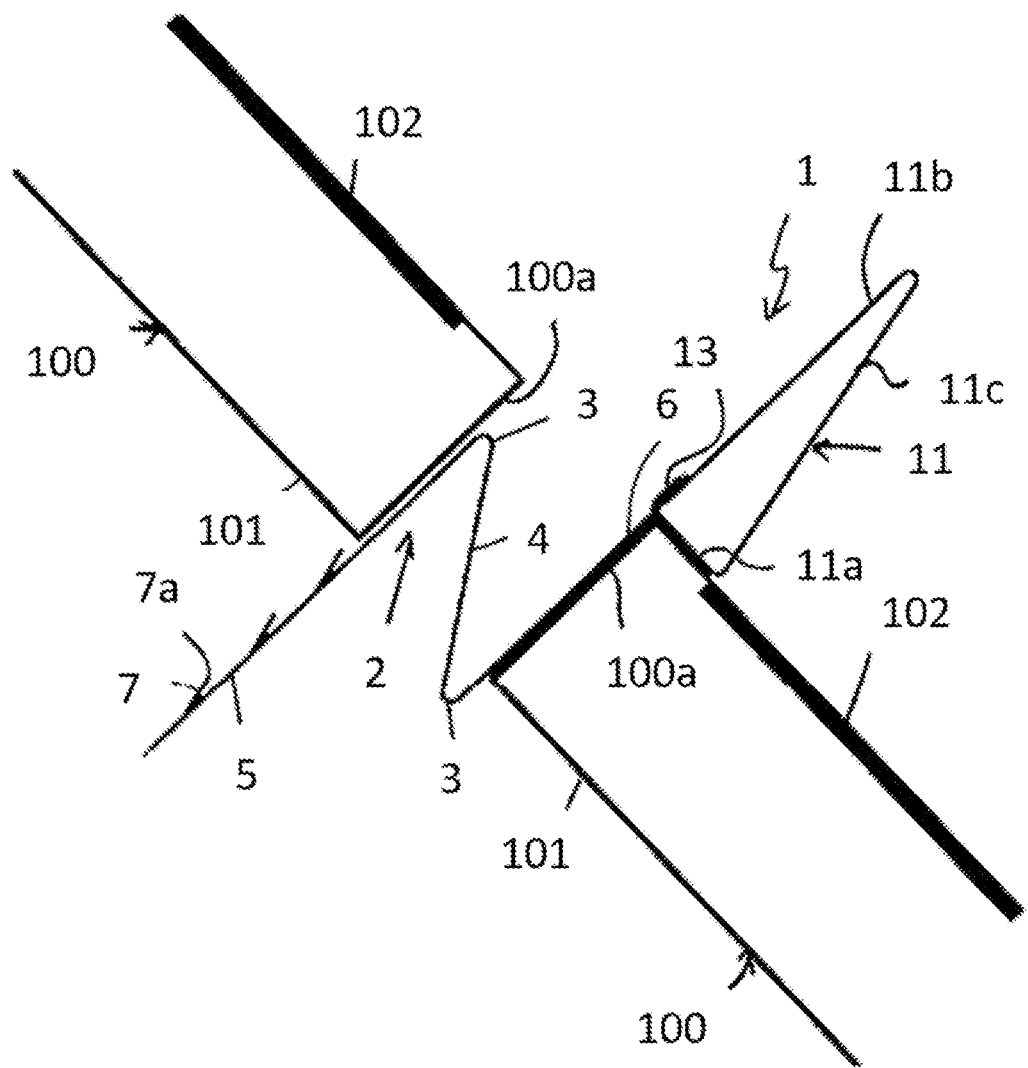
FIG. 1 shows a front cross-sectioned view of a snow hook according to the present invention during use when fitted between two solar panels.
Figure 4:
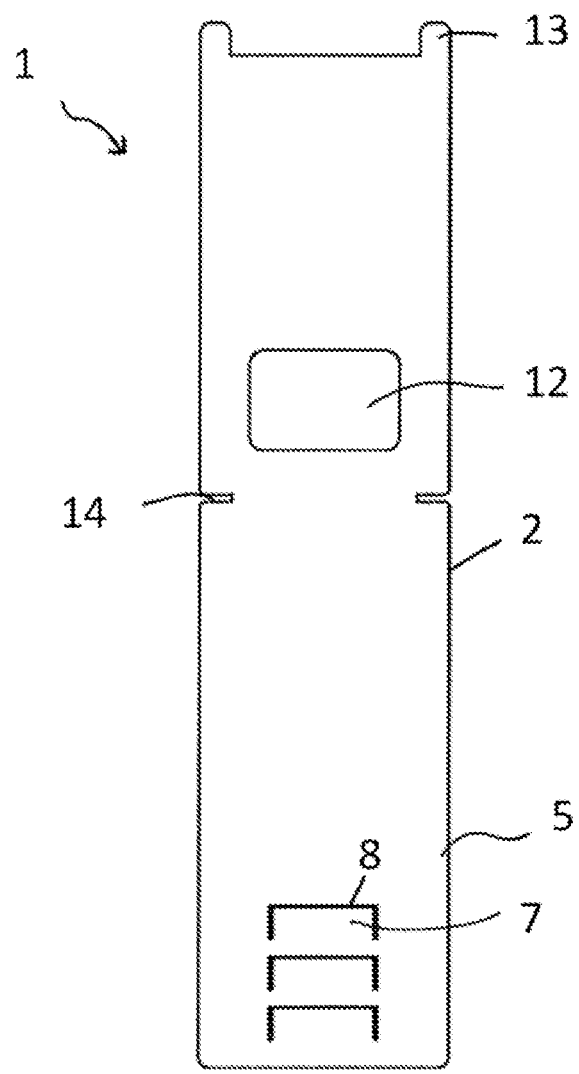
FIG. 4 is a front view of the snow hook according to the present invention, during a step of the manufacturing method prior to folding.

With reference to FIG. 1, a snow hook 1 for solar panels, namely a profiled part intended to be mounted on the roof of a house, on top of which the solar panels are installed, is described below. The profiled part is intended to prevent solid blocks of snow on the solar panels from suddenly sliding and falling onto the ground following changes in temperature and solar irradiation.

The snow hook 1 comprises a plate 2.

The plate 2 advantageously is metallic.

Advantageously, the snow hook 1 is metallic.

The plate 2 has for example a substantially constant width of between 2 and 5 cm.

The plate 2 comprises at least two folding lines 3. The folding lines 3 delimit an inclined portion 4 between two parallel portions 5, 6 of the plate 2. The folding lines 3 provide a section of the plate 2 with a substantially zig-zag shape.

Such a zig-zag form may be obtained from a flat plate 2 which has been suitably folded along the two folding lines 3. As will become clear from a method of manufacturing the snow hook 1 according to the present invention, described in detail in the continuation of the present description, the plate 2 may be machined before folding along the two folding lines 3, in particular by means of shearing and cutting, in order to define further structural characteristics of the snow hook 1.

The two parallel portions 5, 6 have a predefined distance between them in the rest condition, namely when the snow hook 1 is not subject to any force.

This distance is greater than an installation distance of two solar panels 100 between which the hook 1 is to be installed. The aforementioned folding of the plate 2, therefore, is adjusted so as to obtain parallel portions 5, 6 which are suitably spaced from each other, taking into account the distance between the solar panels 100 to which the snow hook 1 must be fitted. For example, solely by way of example, folding may be performed so as to obtain parallel portions 5, 6 which are spaced apart by 4 cm if the distance between the solar panels 100 between which the hook 1 must be installed is equal to about 3 cm.

According to the present invention, a predetermined amplitude $\alpha$ of at least one angle between a parallel portion 5 and the inclined portion 4 in the rest condition can be reduced. This reduction is obtained by means of the flexibility of the metallic material and the configuration of the folding lines 3.

The amplitude $\alpha$ is reduced by moving the parallel portions 5, 6 closer together and correspondingly increasing the inclination of the inclined portion 4 in order to insert the snow hook 1 between two adjacent solar panels 100, in particular between two opposite and parallel sides 100a of the two solar panels 100.

Each of these sides 100a joins the operating surface 102 of the solar panel, also called top surface of the solar panel, i.e. the surface which is exposed to the sunlight during use, to a base or bottom 100 of the solar panel, which is directed towards the roof of the house or the building in question.

Each of the parallel portions 5, 6, during use, is in contact with a side 100a of a respective solar panel 100.

The parallel portions 5, 6 are recalled towards their distance at rest when released (i.e. when no longer held close together), so as to cause the pressing contact of each parallel portion 5,6 against a surface 100a of the side of the respective solar panel 100. The zig-zag portion of the plate 2 acts as a recall spring for the parallel portions 5, 6.

The plate 2, according to the present invention, is made of stainless steel. Therefore, the plate 2 is particularly strong, has an attractive appearance and may be easily installed, by means of compression, namely by manually moving closer together (without the use of tools) the parallel portions 5, 6, and releasing them, such that the inclined portion 4 returns into its rest configuration.

Preferably, both the amplitudes α, α' (FIG. 3) of both the angles which have a predetermined amplitude in the rest condition between the parallel portions 5, 6 and the inclined portion 4 can be reduced, by means of the movement together of the parallel portions 5, 6.

Further features simplify the installation of the snow hook 1.

In particular, a parallel portion 5 of the plate, i.e. that intended to be directed towards the base 101 of the solar panel 100 which, during use, is not exposed to the sunlight, called also bottom portion 5 of the plate 2, comprises one or more teeth 7.

Each tooth 7 has a joining (or attachment) line 9 on the bottom portion 5, where the tooth 7 remains attached to the bottom portion 5.

The tooth 7 extends from the joining line 9 of the bottom portion 5.

The tooth 7, preferably, forms a part of the bottom portion 5 which has been partially separated (cut) from the bottom portion 5, remaining attached thereto along the joining line 9, and has been suitably spaced from the remainder of the bottom portion 5, within the cut area.

Preferably, the distance of the tooth 7 with respect to a plane of the surface of the bottom portion 5, measured perpendicularly with respect to the plane at a first point of the tooth 7, is smaller than the distance at a second point of the tooth 7 which is situated closer to the inclined portion 4, again measured perpendicularly with respect to the plane at the second point of the tooth 7.

In other words, the tooth 7 extends from the joining line 9 towards the outside of the bottom portion 5 in an increasing manner towards the inclined portion 4.

The tooth 7 therefore has a portion for engagement with the solar panel 100 which extends from the joining line 9 upwards, preferably at a predefined angle with respect to a surface of the bottom portion 5.

The engaging portion comprises a profile 7a which is intended to come into contact with a surface of the base 101 of the solar panel 100.

For example, the tooth 7 is a window which is open from the cutting line 8 of the bottom portion 5, for example from a square cutting line 8.

Such a configuration is provided so that the tooth may snap-engage underneath the base 101 of the solar panel, during use. In particular, during insertion of the snow hook 1 between the two solar panels 100, the tooth 7 comes into contact with the side 100a of the solar panel. During this step, the tooth 7 may be compressed towards the opening 50 in the bottom portion 5 from which it has been formed; then, when there is no longer any resistance of the side 100a of the solar panel, i.e. when the tooth 7 snap-engages underneath the surface 101 of the panel into the empty space, the tooth 7 returns into its original position, i.e. protruding from the opening 50.

Moreover, the snow hook 1 is provided with a plurality of teeth 7 aligned above one another along an axis of the bottom portion 5.

The teeth are spaced at a predefined distance from each other.

Each tooth 7 is intended to engage with the solar panel at a corresponding depth of insertion between the two panels 100.

In operational terms, after a first tooth has snap-engaged underneath the surface 101 of the solar panel, a second tooth 7 may come into contact with the side 100a of the solar panel.

This situation occurs if the installation engineer considers that the insertion of the first tooth 7 alone is not sufficient to obtain the correct depth of installation of the snow hook 1 with respect to the working surface 102 of the solar panel.

During the further insertion of the snow hook 1, the second tooth is compressed towards the opening 50 in the respective bottom portion 5 from which it has been formed and then, when there is no longer any resistance of the side 100a and the second tooth 7 snap-engages underneath the surface 101 of the panel into the empty space, it returns into its original position, protruding from the opening 50.

Various installation measures may be obtained using a plurality of teeth 7. Therefore, a plurality of snow hooks 1 may be installed at a same installation depth taking into account the number of teeth to be snap-engaged beyond the base 101 (bottom) of the solar panel.

A second parallel portion 6 of the plate 2, intended to be directed towards a top surface or working surface 102 of the solar panel which, during use, is exposed to the sunlight, comprises an element 11 with a triangular cross-section. This second parallel portion 6 is also referred to, in the continuation of the description, as the top portion 6 of the plate 2.

In fact the element 11 with a triangular cross-section has a base 11a intended to rest on the top surface 102 of the solar panel 100, a first side surface 11b, coplanar with the surface of the top portion 6, in fact corresponding thereto, and a second side surface 11c between the base 11a and the first side surface 11b.

The base 11a preferably comprises hooks 13 which are folded back with respect to the surface of the base 11a.

The hooks 13 are engaged inside slots 14 on the first side surface 11b.

Such a structure of the triangular section 11 is particularly strong and withstands heavy ice loads without being deformed in any way.

Moreover, according to an embodiment, the first side surface 11b comprises one or more holes 12, for example a square hole. The hole allows the weight of the snow hook to be reduced.

The method of manufacturing the snow hook 1 for solar panels comprises the steps of:
preparing a flat plate 2 made of stainless steel;
defining at least two folding lines 3 on the plate 2;
folding the plate 2, so as to delimit an inclined portion 4 between two parallel portions 5, 6 of the plate 2, the two parallel portions 5, 6 having a predefined distance between them in the rest condition, where the plate 2 is flexible and has a form memory so that a predetermined amplitude α of at least one angle between a parallel portion 5 and the inclined portion 4 in the rest condition can be reduced, by moving the parallel portions 5, 6 closer together, in order to insert the snow hook 1 between two solar panels, the parallel portions 5, 6 being recalled towards their distance at rest condition when released, so as to cause the pressing contact of each parallel portion 5, 6 against a surface of a respective solar panel of the two solar panels.

The manufacturing method involves further processing steps, some of which are performed before folding along the folding lines 3.

In particular, these steps performed before folding along the folding lines 3 comprise:
- forming cutting lines 8 on the flat plate 2;
- forming one or more holes 12 in the flat plate 2;
- forming two hooks 13 at one end of the flat plate 2;
- forming engaging slots 14.

The manufacturing method involves further processing steps, some of which are performed after folding along the folding lines 3.

In particular, these steps performed after folding along the folding lines 3 comprise:
- moving a part of the parallel portion 5 defined by the cutting line 8 away from the remaining surface of the parallel portion 5 and forming at least one tooth 7 which remains attached to the parallel portion 5 along a joining line 9 of the parallel portion 5.

The steps performed after folding along the folding lines 3 further comprise:
- further folding the parallel portion 6 along another two folding lines 20, 21 so as to obtain a triangular section 11 having a base 11a, a first side surface 11b and a second side surface 11c with said hooks 13 at a far end of the plate 2;
- engaging the hooks 13 inside the engaging slots 14.

I claim:

1. A snow hook (1) for solar panels, comprising a plate (2) having at least two folding lines (3) delimiting an inclined portion (4) between two parallel portions (5, 6) of the plate (2), said two parallel portions (5, 6) define a first parallel portion (5) and a second parallel portion (6), the two parallel portions (5, 6) having a predefined distance between them in a rest condition, wherein a predetermined amplitude ($\alpha$) of at least one angle between the two parallel portions (5, 6) and the inclined portion (4) in the rest condition can be reduced, by moving closer together the two parallel portions (5, 6), in order to insert the snow hook (1) between two solar panels (100), said two parallel portions (5, 6) being recalled towards the rest condition when released, so as to cause a pressing contact of each of said two parallel portions (5, 6) against a surface (100a) of a respective solar panel of said two solar panels (100), said plate being made of stainless steel.

2. The snow hook (1) according to claim 1, wherein the first parallel portion (5) of the plate (2) is intended to be directed towards a base (101) of one of said two solar panels (100) which, during use, is not exposed to the sunlight, also called bottom portion (5), comprises one or more teeth (7), each of the one or more teeth (7) has a joining line (9) on the bottom portion (5) and a portion for engagement with the solar panel (100) which extends from the joining line (9) upwards, at a predefined angle with respect to a surface of the bottom portion (5), said engaging portion comprising a profile (7a) intended to come into contact with a surface of said base (101).

3. The snow hook (1) according to claim 2, wherein each of the one or more teeth (7) is folded out from a cutting line (8) of the bottom portion (5), preferably a square cutting line (8).

4. The snow hook (1) according to claim 2, wherein the one or more teeth (7) are aligned above one another along an axis of the bottom portion (5), spaced at a predefined distance from each other, wherein each of the one or more teeth (7) is designed to engage with the solar panel at a different insertion depth between the two panels (100).

5. The snow hook (1) according to claim 1, wherein the second parallel portion (6) of the plate (2) intended to be directed towards a top surface (102) of another of the solar panels which, during use, is exposed to the sunlight, called also top portion (6), comprises an element (11) with a triangular cross-section, having a base (11a) intended to rest on the top surface (102) of the another of the solar panels (100), a first side surface (11b) coplanar with a side surface of the another of the solar panels, and a second side surface (11c) between the base (11a) and the first side surface (11b).

6. The snow hook (1) according to claim 5, wherein said base (11a) comprises hooks (13), which are preferably folded back with respect to a surface of the base (11a), said hooks (13) being engaged inside slots (14) on the first side surface (11b).

7. The snow hook (1) according to claim 5, wherein said first side surface (11b) comprises a hole (12), preferably a square hole.

8. The snow hook (1) according to claim 1, wherein the amplitudes ($\alpha$, $\alpha'$) of both the angles which have a predetermined amplitude in the rest condition between the parallel portions (5, 6) and the inclined portion (4) can be reduced, by moving the parallel portions (5, 6) closer together.

9. A method of manufacturing a snow hook (1) for solar panels comprising the steps of:
- preparing a plate (2) made of stainless steel;
- defining at least two folding lines (3);
- folding the plate (2), so as to delimit an inclined portion (4) between two parallel portions (5, 6) of the plate (2), the two parallel portions (5, 6) having a predefined distance between them in the rest condition, where the plate (2) is flexible and has a form memory so that a predetermined amplitude ($\alpha$) of at least one angle between said two parallel portions (5, 6) and the inclined portion (4) in the rest condition can be reduced, by moving the parallel portions (5, 6) closer together, and in order to insert the snow hook (1) between two solar panels, said parallel portions (5, 6) returning into their spaced rest condition when released, so as to cause a pressing contact of each of said two parallel portions (5, 6) against a surface of a respective solar panel of said two solar panels.

10. The method of manufacturing a snow hook (1) according to claim 9, further comprising:
- forming cutting lines (8) on the plate (2);
- moving a part of one of the two parallel portions (5, 6) delimited by the cutting line (8) away from a remaining surface of the one of the two parallel portions (5, 6) and forming at least one tooth (7) which remains attached to the one of the two parallel portions (5, 6) along a surface joining line (9) of the one of the parallel portion (5); and
- extending teeth (7) from the cutting line (8) upwards, at a predefined angle with respect to a surface of the one of the two parallel portions (5), said teeth (7) comprising a portion for engagement with the one of the solar panels (100) having a profile (7a) intended to come into contact with a base surface of the one of the solar panels, and a joining line (9) on the one of the two parallel portions (5, 6).

\* \* \* \* \*